United States Patent
Nakamura et al.

(10) Patent No.: US 12,218,716 B2
(45) Date of Patent: Feb. 4, 2025

(54) TERMINAL APPARATUS AND BASE STATION APPARATUS

(71) Applicant: SHARP KABUSHIKI KAISHA, Osaka (JP)

(72) Inventors: Osamu Nakamura, Osaka (JP); Shohei Yamada, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 748 days.

(21) Appl. No.: 17/289,949

(22) PCT Filed: Oct. 25, 2019

(86) PCT No.: PCT/JP2019/041874
§ 371 (c)(1),
(2) Date: Apr. 29, 2021

(87) PCT Pub. No.: WO2020/090645
PCT Pub. Date: May 7, 2020

(65) Prior Publication Data
US 2022/0014235 A1   Jan. 13, 2022

(30) Foreign Application Priority Data
Oct. 31, 2018 (JP) .................... 2018-205079

(51) Int. Cl.
*H04W 72/04* (2023.01)
*H04B 7/005* (2006.01)
*H04W 72/12* (2023.01)

(52) U.S. Cl.
CPC ............ *H04B 7/005* (2013.01); *H04W 72/04* (2013.01); *H04W 72/12* (2013.01)

(58) Field of Classification Search
None
See application file for complete search history.

(56) References Cited

U.S. PATENT DOCUMENTS 10,575,299 B2 * 2/2020 Ying ................. H04W 72/23
2018/0288746 A1 * 10/2018 Zhang ................ H04L 1/0031

OTHER PUBLICATIONS

VIVO, "Enhanced UL grant-free transmission for URLLC", R1-1810397, 3GPP TSG RAN WG1 Meeting #94bis, Chengdu, China, Oct. 8-12, 2018.
Huawei et al., "[NR-AH1801#15] [NR UP/MAC] Repetition aspects—Huawei", R2-1802212, 3GPP TSG RAN WG2 Meeting 101, Athens, Greece, Feb. 26-Mar. 2, 2018.
(Continued)

*Primary Examiner* — Willie J Daniel, Jr.
(74) *Attorney, Agent, or Firm* — ScienBiziP, P.C.

(57) ABSTRACT

In a case of configuring multiple configured grants, signal detection in a base station apparatus is efficiently performed. For configured grant scheduling, by configuring a plurality of time offset values, multiple transmission opportunities are generated. To each of the transmission opportunities, a slot retransmission is applied. In a case that multiple transmission patterns are generated due to the plurality of time offsets, transmission is performed by using a transmission pattern, among the multiple transmission patterns, that causes the number of remaining retransmissions to increase.

8 Claims, 5 Drawing Sheets

(56) References Cited

OTHER PUBLICATIONS

NTT DOCOMO, Inc., "Summary of 7.2.6.4 Enhanced UL grant-free transmissions", R1-1811822, 3GPP TSG RAN WG1 Meeting #94bis, Chengdu, China, Oct. 8-12, 2018.
Nokia et al., "On Configured Grant enhancements for NR URLLC", R1-1810662, 3GPP TSG RAN WG1 Meeting #94bis, Chengdu, China, Oct. 8-12, 2018.
Physical channels and modulation, 5G, NR, 3GPP TS 38.211 version 15.2.0 Release 15, ETSI TS 138 211 V15.2.0 (Jul. 2018).
Huawei, HiSilicon, Nokia, Nokia Shanghai Bell, New SID on Physical Layer Enhancements for NR URLLC, 3GPP TSG-RAN#80, RP-181477, La Jolla, US, Jun. 11-14, 2018.
Huawei, HiSilicon, Enhanced UL configured grant transmissions, Discussion and decision, 3GPP TSG RAN WG1 Meeting #94, R1-1808100, Gothenburg, Sweden, Aug. 20-24, 2018.

* cited by examiner

TERMINAL APPARATUS AND BASE STATION APPARATUS

TECHNICAL FIELD

The present invention relates to a terminal apparatus and a base station apparatus. This application claims priority based on Japanese Patent Application No. 2018-205079 filed on Oct. 31, 2018, the contents of which are incorporated herein by reference.

BACKGROUND ART

In a Long Term Evolution (LTE) communication system specified in Third Generation Partnership Project (3GPP), dynamic scheduling in which a base station apparatus notifies a terminal apparatus of Downlink Control Information (DCI, grant), and data transmission is performed by the notified DCI is specified. In the dynamic scheduling, in a case that one piece of DCI is received, a single transmission is performed. On the other hand, in addition to the dynamic scheduling, Semi-Persistent Scheduling (SPS) for periodically allocating a radio resource is specified. In the SPS, even in a case of receiving one piece of DCI, periodic radio resource allocation is performed, and therefore data transmission can be performed multiple times.

In 3GPP, the fifth generation mobile communication (New Radio, NR) is currently being standardized using enhanced Mobile Broad Band (eMBB), Ultra-Reliable and Low Latency Communications (URLLC), and massive Machine-Type Communications (mMTC) as use cases. In NR Rel-15, Configured Scheduling (CS, configured grant scheduling), which is expansion of LTE SPS, is specified. In the CS, transmission by iterating a slot is possible, and reliability of the transmission can be improved.

In Rel-16, achieving higher reliability (packet reception success rate 99.9999%) and low latency (delay from 0.5 ms to 1 ms) is being performed at 3GPP (Non Patent Literature (NPL) 2 and NPL 3).

CITATION LIST

Non Patent Literature

NPL 1: 3GPP TS38.211, V15.2.0, "Physical channels and modulation (Release 15)".

NPL 2: Huawei, HiSilicon, Nokia, Nokia Shanghai Bell, "SID on Physical Layer Enhancements for NR URLLC", RP-181477.

NPL 3: Huawei, HiSilicon, "Enhanced UL configured grant transmissions", R1-1808100.

SUMMARY OF INVENTION

Technical Problem

In Rel-16, reliability and low latency are to be improved. Increasing transmission opportunities by preparing multiple configurations as a CS configuration has been studied. However, details such as priority in a case that there are multiple configurations have not been sufficiently studied. On the other hand, multiple CS configurations need to be performed by defining a control signal by the terminal apparatus and the base station apparatus and transmitting the control signal.

An aspect of the present invention has been made in view of these circumstances, and an object of the present invention is to provide a control method in a case that there are multiple CS configurations.

Solution to Problem

To address the above-mentioned drawbacks, a base station apparatus, a terminal apparatus, and a communication method according to an aspect of the present invention are configured as follows.

(1) An aspect of the present invention is a terminal apparatus for communicating with a base station apparatus by configured grant scheduling, the terminal apparatus including: a controller configured to configure a time offset of the configured grant scheduling to have multiple values; and a higher layer processing unit configured to configure the number of repetitions of the configured grant scheduling to be a value greater than one, in which the controller starts transmission by using a configuration that causes the number of repetitions to increase, the number being the value greater than one.

(2) In the aspect of the present invention, the controller may configure a plurality of the time offsets by receiving multiple physical downlink control channels (PDCCHs) effective to activate configured grant scheduling, and may release the configuration of the plurality of the time offsets by receiving one PDCCH effective to release configured grant scheduling.

(3) In the aspect of the present invention, the controller may control a configuration of a different time offset and an update of a time offset by using a value of a field related to a hybrid automatic repeat request (HARD) of a PDCCH.

(4) In the aspect of the present invention, a plurality of the time offsets may be configured in the higher layer processing unit, and the plurality of the time offsets may be input to the controller.

(5) An aspect of the present invention is a base station apparatus for communicating with a terminal apparatus by configured grant scheduling, the base station apparatus including: a controller configured to configure a time offset of the configured grant scheduling to have multiple values; and a higher layer processing unit configured to configure the number of repetitions of the configured grant scheduling to be a value greater than one, in which a receiver configured to perform reception in a case that a transmitter of the terminal apparatus starts transmission by using a configuration that causes the number of repetitions to increase, the number being the value greater than one.

ADVANTAGEOUS EFFECTS OF INVENTION

According to one or multiple aspects of the present invention, a base station apparatus and a terminal apparatus can perform selection in which multiple CS configurations can be performed.

DESCRIPTION OF EMBODIMENTS

A communication system according to the present embodiment includes a base station apparatus (a cell, a small cell, a serving cell, a component carrier, an eNodeB, a Home eNodeB, and a gNodeB) and a terminal apparatus (a terminal, a mobile terminal, and User Equipment (UE)). In the communication system, in a case of a downlink, the base station apparatus serves as a transmitting apparatus (a transmission point, a transmit antenna group, a transmit antenna port group, or a Tx/Rx Point (TRP)), and the terminal apparatus serves as a receiving apparatus (a reception point, a reception terminal, a receive antenna group, or a receive antenna port group). In a case of an uplink, the base station apparatus serves as a receiving apparatus, and the terminal apparatus serves as a transmitting apparatus. The communication system is also applicable to Device-to-Device (D2D, sidelink) communication. In this case, the terminal apparatus serves both as a transmitting apparatus and as a receiving apparatus.

The communication system is not limited to data communication between the terminal apparatus and the base station apparatus with human intervention. That is, the communication system is also applicable to a form of data communication requiring no human intervention, such as Machine Type Communication (MTC), Machine-to-Machine (M2M) Communication, communication for Internet of Things (IoT), or Narrow Band-IoT (NB-IoT) (hereinafter referred to as MTC). In this case, the terminal apparatus serves as an MTC terminal. The communication system can use, in the uplink and the downlink, a multi-carrier transmission scheme, such as a Cyclic Prefix-Orthogonal Frequency Division Multiplexing (CP-OFDM). The communication system uses, in the uplink, in a case that a higher layer parameter related to Transform precoder is configured, a transmission scheme, such as a Discrete Fourier Transform Spread-Orthogonal Frequency Division Multiplexing (DFTS-OFDM, also referred to as an SC-FDMA) to which Transform precoding is applied, that is, DFT is applied. Although the following describes a case of using an OFDM transmission scheme in the uplink and the downlink, the transmission scheme is not limited to this and another transmission scheme is applicable.

The base station apparatus and the terminal apparatus according to the present embodiment can communicate in a frequency band for which an approval of use (license) has been obtained from the government of a country or region where a radio operator provides services, that is, a so-called licensed band, and/or in a frequency band for which no approval (license) from the government of the country or region is required, that is, a so-called unlicensed band.

According to the present embodiment, "X/Y" includes the meaning of "X or Y". According to the present embodiment, "X/Y" includes the meaning of "X and Y". According to the present embodiment, "X/Y" includes the meaning of "X and/or Y".

First Embodiment

Figure 1:
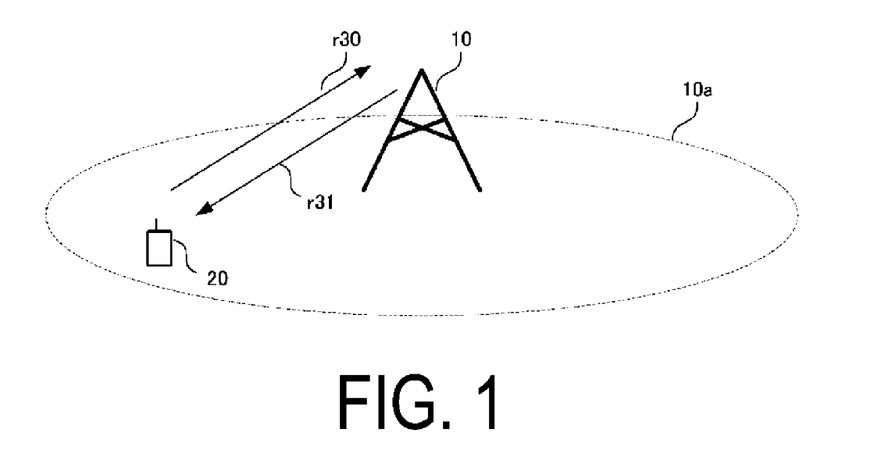
FIG. 1 is a diagram illustrating a configuration example of a communication system 1 according to a first embodiment.

FIG. 1 is a diagram illustrating a configuration example of a communication system 1 according to the present embodiment. The communication system 1 according to the present embodiment includes a base station apparatus 10 and a terminal apparatus 20. A coverage 10a is a range (a communication area) in which the base station apparatus 10 can connect (communicate) to the terminal apparatus 20 (coverage 10a is also referred to as a cell). Note that the base station apparatus 10 can accommodate multiple terminal apparatuses 20 in the coverage 10a.

In FIG. 1, an uplink radio communication r30 at least includes the following uplink physical channels. The uplink physical channels are used for transmitting information output from a higher layer.

Physical Uplink Control CHannel (PUCCH)
Physical Uplink Shared CHannel (PUSCH)
Physical Random Access CHannel (PRACH)

The PUCCH is a physical channel that is used to transmit Uplink Control Information (UCI). The Uplink Control Information includes a positive acknowledgement (ACK)/Negative acknowledgement (NACK) for downlink data. Here, the downlink data refers to Downlink transport block, Medium Access Control Protocol Data Unit: MAC PDU, Downlink-Shared Channel: DL-SCH, Physical Downlink Shared Channel: PDSCH, and the like. The ACK/NACK is also referred to as a Hybrid Automatic Repeat request ACKnowledgement (HARQ-ACK), a HARQ feedback, a HARQ response, or a signal indicating HARQ control information or a delivery confirmation.

The NR supports at least five formats of a PUCCH format 0, a PUCCH format 1, a PUCCH format 2, a PUCCH format 3, and a PUCCH format 4. The PUCCH format 0 and the PUCCH format 2 include one or two OFDM symbols, and the other PUCCHs include 4 to 14 OFDM symbols. Furthermore, the bandwidth of the PUCCH format 0 and the PUCCH format 1 includes 12 subcarriers. Furthermore, in the PUCCH format 0, a 1-bit (or 2-bit) ACK/NACK is transmitted on resource elements of 12 subcarriers and one OFDM symbol (or two OFDM symbols).

The uplink control information includes a Scheduling Request (SR) used to request a PUSCH (Uplink-Shared Channel (UL-SCH)) resource for initial transmission. The scheduling request indicates that the UL-SCH resource for initial transmission is requested.

The uplink control information includes downlink Channel State Information (CSI). The downlink channel state information includes a Rank Indicator (RI) indicating a preferable spatial multiplexing order (the number of layers), a Precoding Matrix Indicator (PMI) indicating a preferable precoder, a Channel Quality Indicator (CQI) designating a preferable transmission rate, and the like. The PMI indicates a codebook determined by the terminal apparatus. The codebook is related to precoding of the physical downlink shared channel.

In the NR, a higher layer parameter RI restriction can be configured. There are multiple configuration parameters for the RI restriction, one thereof is a type 1 single panel RI restriction, which includes eight bits. The type 1 single panel RI restriction, which is a bitmap parameter, forms a bit sequence $r_7, r_2, r_1$. Here, $r_7$ is the Most Significant Bit (MSB), and $r_0$ is the Least Significant Bit (LSB). In a case that $r_i$ is zero (i is 0, 1, . . . 7), the PMI corresponding to a precoder associated with the i+1 layer and RI reporting are not acceptable. The RI restriction includes, in addition to the type 1 single panel RI restriction, a type 1 multi-panel RI restriction, which includes four bits. The type 1 multi-panel RI restriction, which is a bitmap parameter, forms a bit sequence $r_4, r_3, r_2, r_1$. Here, $r_4$ is the MSB, and $r_0$ is the LSB. In a case that $r_i$ is zero (i is 0, 1, 2, 3), the PMI corresponding to a precoder associated with the i+1 layer and RI reporting are not acceptable.

The CQI can use an index (CQI index) indicative of a preferable modulation scheme (for example, QPSK, 16 QAM, 64 QAM, 256 QAMAM, or the like), a preferable coding rate, and a preferable frequency utilization efficiency in a predetermined band. The terminal apparatus selects, from a CQI table, a CQI index considered to allow a transport block on the PDSCH to be received within a block error probability (BLER) 0.1. Note that, in a case that a prescribed CQI table is configured by higher layer signaling, the CQI index considered to make reception possible without exceeding BLER=0.00001 is selected from the CQI table.

The PUSCH is a physical channel used to transmit uplink data (an Uplink Transport Block, an Uplink-Shared Channel (UL-SCH)), and CP-OFDM or DFT-S-OFDM is applied as a transmission scheme. The PUSCH may be used to transmit the HARQ-ACK in response to the downlink data and/or the channel state information along with the uplink data. The PUSCH may be used to transmit only the channel state information. The PUSCH may be used to transmit only the HARQ-ACK and the channel state information.

The PUSCH is used to transmit radio resource control (Radio Resource Control (RRC)) signaling. The RRC signaling is also referred to as an RRC message/RRC layer information/an RRC layer signal/an RRC layer parameter/an RRC information element. The RRC signaling is information/signal processed in a radio resource control layer. The RRC signaling transmitted from the base station apparatus may be signaling common to multiple terminal apparatuses in a cell. The RRC signaling transmitted from the base station apparatus may be signaling dedicated to a certain terminal apparatus (also referred to as dedicated signaling). In other words, user equipment specific (user equipment unique) information is transmitted using the signaling dedicated to the certain terminal apparatus. The RRC message can include a UE Capability of the terminal apparatus. The UE Capability is information indicating a function supported by the terminal apparatus.

The PUSCH is used to transmit a Medium Access Control Element (MAC CE). The MAC CE is information/signal processed (transmitted) in a Medium Access Control layer. For example, a power headroom may be included in the MAC CE and may be reported via the physical uplink shared channel. In other words, a MAC CE field is used to indicate a level of the power headroom. The uplink data can include the RRC message and the MAC CE. The RRC signaling and/or the MAC CE is also referred to as a higher layer signal (higher layer signaling). The RRC signaling and/or the MAC CE are included in a transport block.

The PRACH is used to transmit a preamble used for random access. The PRACH is used to transmit a random access preamble. The PRACH is used for indicating an initial connection establishment procedure, a handover procedure, a connection re-establishment procedure, synchronization (timing adjustment) for uplink transmission, and a request for the PUSCH (UL-SCH) resource.

In the uplink radio communication, an Uplink Reference Signal (UL RS) is used as an uplink physical signal. The uplink reference signal includes a Demodulation Reference Signal (DMRS) and a Sounding Reference Signal (SRS). The DMRS is associated with transmission of the physical uplink-shared channel/physical uplink control channel. For example, the base station apparatus 10 uses the demodulation reference signal to perform channel estimation/channel compensation in a case of demodulating the physical uplink-shared channel/the physical uplink control channel.

The SRS is not associated with the transmission of the physical uplink shared channel/the physical uplink control channel. The base station apparatus 10 uses the SRS to measure an uplink channel state (CSI Measurement).

In FIG. 1, at least the following downlink physical channels are used in radio communication of the downlink r31. The downlink physical channels are used for transmitting information output from the higher layer.

Physical Broadcast CHannel (PBCH)
Physical Downlink Control CHannel (PDCCH)
Physical Downlink Shared CHannel (PDSCH)

The PBCH is used for broadcasting a Master Information Block (MIB, a Broadcast CHannel (BCH)) that is used commonly by the terminal apparatuses. The MIB is one of pieces of system information. For example, the MIB includes a downlink transmission bandwidth configuration and a System Frame Number (SFN). The MIB may include information indicating at least some of numbers of a slot, a subframe, and a radio frame in which a PBCH is transmitted.

The PDCCH is used to transmit downlink control information (DCI). For the downlink control information, multiple formats based on applications (also referred to as DCI formats) are defined. The DCI format may be defined based on the type and the number of bits of the DCI constituting a single DCI format. Each format is used depending on the application. The downlink control information includes control information for downlink data transmission and control information for uplink data transmission. A DCI format for downlink data transmission is also referred to as downlink assignment (or downlink grant). A DCI format for uplink data transmission is also referred to as uplink grant (or uplink assignment).

A single downlink assignment is used for scheduling a single PDSCH in a single serving cell. The downlink grant may be used for at least scheduling of the PDSCH within the same slot as the slot in which the downlink grant has been transmitted. The downlink assignment includes downlink control information, such as frequency domain resource allocation for the PDSCH, time domain resource allocation, a Modulation and Coding Scheme (MCS) for the PDSCH, a NEW Data Indicator (NDI) for indicating initial transmission or retransmission, information for indicating the HARQ process number in the downlink, and a Redundancy version for indicating an amount of redundancy added to the codeword during error correction coding. The codeword is data after the error correcting coding. The downlink assignment may include a Transmission Power Control (TPC) command for the PUCCH and a TPC command for the PUSCH. The uplink grant may include a Repetition number for indicating the number of retransmissions of the PUSCH. Note that the DCI format for each downlink data transmission includes information (fields) required for the application among the above-described information.

A single uplink grant is used for notifying the terminal apparatus of scheduling of a single PUSCH in a single serving cell. The uplink grant includes uplink control information, such as information on the resource block allocation for transmission of the PUSCH (resource block allocation and hopping resource allocation), time domain resource allocation, information on the MCS for the PUSCH (MCS/Redundancy version), information on a DMRS port, information on retransmission of the PUSCH, a TPC command for the PUSCH, and a downlink Channel State Information (CSI) request (CSI request). The uplink grant may include information for indicating the HARQ process number in the uplink, a Transmission Power Control (TPC) command for the PUCCH, and a TPC command for the PUSCH. Note that the DCI format for each uplink data transmission includes information (fields) required for the application among the above-described information.

An OFDM symbol number (position) at which a DMRS symbol is transmitted is given, in the case that frequency hopping is not applied and in a case of a PUSCH mapping type A, by the signaled period between the first OFDM symbol of the slot and the last OFDM symbol of the PUSCH resource scheduled in the slot. The OFDM symbol number is given, in the case that frequency hopping is not applied and in a case of a PUSCH mapping type B, by the scheduled PUSCH resource period. The OFDM symbol number is given, in the case that frequency hopping is applied, by a period per a hop. For the PUSCH mapping type A, only in a case that a higher layer parameter indicating the leading DMRS position is 2, a case that a higher layer parameter indicating the number of additional DMRSs is 3 is supported. Furthermore, for the PUSCH mapping type A, a four-symbol period is applicable only in a case that the higher layer parameter indicating the leading DMRS position is 2.

The PDCCH is generated by adding a Cyclic Redundancy Check (CRC) to the downlink control information. In the PDCCH, CRC parity bits are scrambled with a predetermined identifier (also referred to as an exclusive OR operation, mask). The parity bits are scrambled with a Cell-Radio Network Temporary Identifier (C-RNTI), a Configured Scheduling (CS)-RNTI, a Temporary C-RNTI, a Paging (P)-RNTI, a System Information (SI)-RNTI, or a Random Access (RA)-RNTI. The C-RNTI and the CS-RNTI are identifiers for identifying a terminal apparatus within a cell. The Temporary C-RNTI is an identifier for identifying the terminal apparatus that has transmitted a random access preamble in a contention based random access procedure. The C-RNTI and the Temporary C-RNTI are used to control PDSCH transmission or PUSCH transmission in a single subframe. The CS-RNTI is used to periodically allocate a resource for the PDSCH or the PUSCH. Here, the PDCCH (DCI format) scrambled with the CS-RNTI is used to activate or deactivate a CS type 2. On the other hand, in a CS type 1, control information (MCS, radio resource allocation, and the like) included in the PDCCH scrambled with the CS-RNTI is included in the higher layer parameter related to the CS, and CS activation (configuration) is performed by the higher layer parameter. The P-RNTI is used to transmit a paging message (Paging CHannel (PCH)). The SI-RNTI is used to transmit the SIB, and the RA-RNTI is used to transmit a random access response (a message 2 in a random access procedure).

The PDSCH is used to transmit the downlink data (the downlink transport block, DL-SCH). The PDSCH is used to transmit a system information message (also referred to as a System Information Block (SIB)). Some or all of the SIBs can be included in the RRC message.

The PDSCH is used to transmit the RRC signaling. The RRC signaling transmitted from the base station apparatus may be common to the multiple terminal apparatuses in the cell (unique to the cell). That is, the information common to the user equipments in the cell is transmitted using the RRC signaling unique to the cell. The RRC signaling transmitted from the base station apparatus may be a message dedicated to a certain terminal apparatus (also referred to as dedicated signaling). In other words, user equipment specific (user equipment unique) information is transmitted by using the message dedicated to the certain terminal apparatus.

The PDSCH is used to transmit the MAC CE. The RRC signaling and/or the MAC CE is also referred to as a higher layer signal (higher layer signaling). A PMCH is used to transmit multicast data (Multicast CHannel (MCH)).

In the downlink radio communication in FIG. 1, a Synchronization signal (SS) and a Downlink Reference Signal (DL RS) are used as downlink physical signals. The downlink physical signals are not used for transmission of information output from the higher layers, but are used by the physical layer.

The synchronization signal is used for the terminal apparatus to take synchronization in the frequency domain and the time domain in the downlink. The downlink reference signal is used for the terminal apparatus to perform the channel estimation/channel compensation on the downlink physical channel. For example, the downlink reference signal is used to demodulate the PBCH, the PDSCH, and the PDCCH. The downlink reference signal can be used for the terminal apparatus to measure the downlink channel state (CSI measurement).

The downlink physical channel and the downlink physical signal are also collectively referred to as a downlink signal. The uplink physical channel and the uplink physical signal are also collectively referred to as an uplink signal. The downlink physical channel and the uplink physical channel are also collectively referred to as a physical channel. The downlink physical signal and the uplink physical signal are also collectively referred to as a physical signal.

The BCH, the UL-SCH, and the DL-SCH are transport channels. Channels used in the Medium Access Control (MAC) layer are referred to as transport channels. A unit of the transport channel used in the MAC layer is also referred to as a Transport Block (TB) or a MAC Protocol Data Unit (PDU). The transport block is a unit of data that the MAC layer delivers to the physical layer. In the physical layer, the transport block is mapped to a codeword, and coding processing and the like are performed for each codeword.

Figure 2:
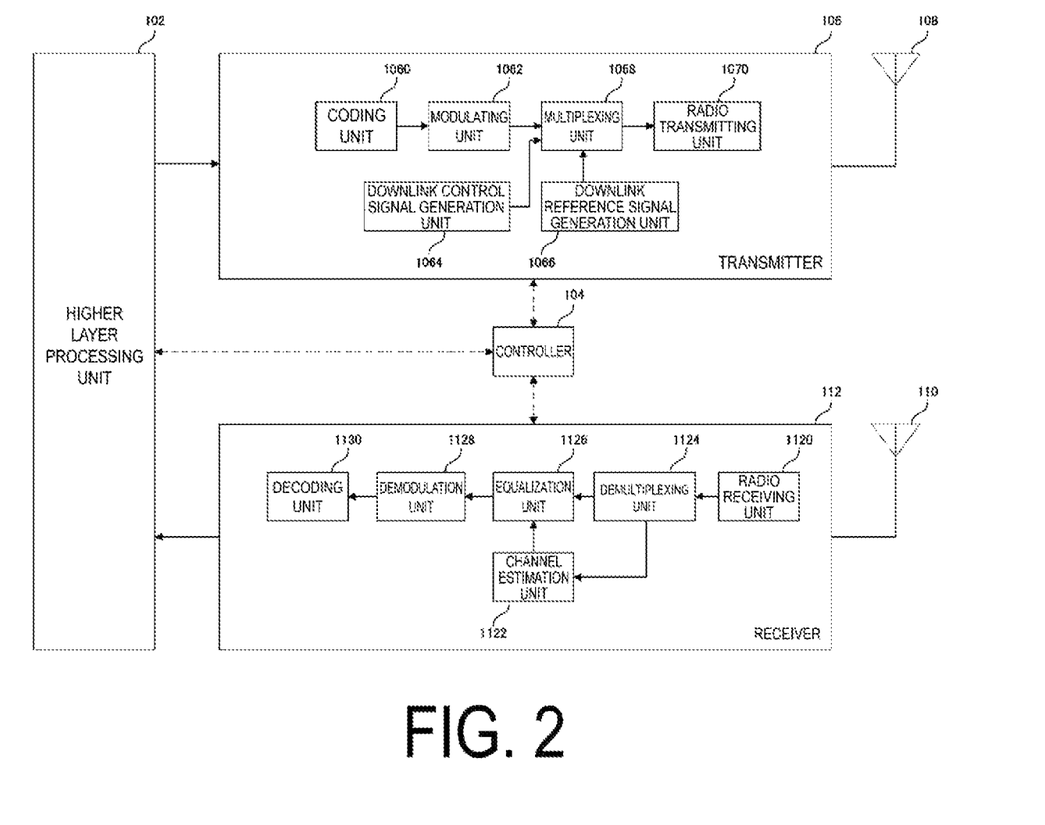
FIG. 2 is a diagram illustrating a configuration example of a base station apparatus according to the first embodiment.

FIG. 2 is a schematic block diagram of a configuration of the base station apparatus 10 according to the present embodiment. The base station apparatus 10 includes a higher layer processing unit (higher layer processing step) 102, a controller (control step) 104, a transmitter (transmitting step) 106, a transmit antenna 108, a receive antenna 110, and a receiver (receiving step) 112. The transmitter 106 generates the physical downlink channel in accordance with a logical channel input from the higher layer processing unit 102. The transmitter 106 is configured to include a coding unit (coding step) 1060, a modulating unit (modulating step) 1062, a downlink control signal generation unit (downlink control signal generating step) 1064, a downlink reference signal generation unit (downlink reference signal generating step) 1066, a multiplexing unit (multiplexing step) 1068, and a radio transmitting unit (radio transmitting step) 1070. The receiver 112 detects (demodulates, decodes, or the like) the physical uplink channel and inputs the content to the higher layer processing unit 102. The receiver 112 is configured to include a radio receiving unit (radio receiving step) 1120, a channel estimation unit (channel estimating step) 1122, a demultiplexing unit (demultiplexing step) 1124, an equalization unit (equalizing step) 1126, a demodulation unit (demodulating step) 1128, and a decoding unit (decoding step) 1130.

The higher layer processing unit 102 performs processing on a layer, such as a Medium Access Control (MAC) layer, a Packet Data Convergence Protocol (PDCP) layer, a Radio Link Control (RLC) layer, and a Radio Resource Control (RRC) layer, that is higher than the physical layer. The higher layer processing unit 102 generates information required to control the transmitter 106 and the receiver 112, and outputs the resultant information to the controller 104. The higher layer processing unit 102 outputs the downlink data (such as DL-SCH), the system information (MIB, SIB), and the like to the transmitter 106. Note that the DMRS configuration information may be notified to the terminal apparatus by using the system information (MIB or SIB), instead of the notification by using the higher layer such as RRC.

The higher layer processing unit 102 generates, or acquires from a higher node, the system information (a part of the MIB or the SIB) to be broadcasted. The higher layer processing unit 102 outputs the system information to be broadcasted to the transmitter 106 as BCH/DL-SCH. The MIB is allocated to the PBCH in the transmitter 106. The SIB is allocated to the PDSCH in the transmitter 106. The higher layer processing unit 102 generates, or acquires from a higher node, the system information (SIB) specific to the terminal apparatus. The SIB is allocated to the PDSCH in the transmitter 106.

The higher layer processing unit 102 configures various RNTIs for each terminal apparatus. The RNTI is used for encryption (scrambling) of the PDCCH, the PDSCH, and the like. The higher layer processing unit 102 outputs the RNTI to the controller 104/the transmitter 106/the receiver 112.

In a case that the downlink data (transport block, DL-SCH) allocated to the PDSCH, the system information specific to the terminal apparatus (System Information Block: SIB), the RRC message, the MAC CE, and the DMRS configuration information are not notified by using the system information, such as the SIB and the MIB, and the DCI, the higher layer processing unit 102 generates, or acquires from a higher node, the DMRS configuration information or the like and outputs the information generated or acquired to the transmitter 106. The higher layer processing unit 102 manages various kinds of configuration information of the terminal apparatus 20. Note that a part of the function of the radio resource control may be performed in the MAC layer or the physical layer.

The higher layer processing unit 102 receives information on the terminal apparatus, such as the function supported by the terminal apparatus (UE capability), from the terminal apparatus 20 (via the receiver 112). The terminal apparatus 20 transmits its own function to the base station apparatus 10 by a higher layer signaling (RRC signaling). The information on the terminal apparatus includes information for indicating whether the terminal apparatus supports a predetermined function or information for indicating that the terminal apparatus has completed introduction and testing of the predetermined function. The information for indicating whether the predetermined function is supported includes information for indicating whether the introduction and testing of the predetermined function have been completed.

In a case that the terminal apparatus supports the predetermined function, the terminal apparatus transmits information (parameters) for indicating whether the predetermined function is supported. In a case that the terminal apparatus does not support the predetermined function, the terminal apparatus may be configured not to transmit information (parameters) for indicating whether the predetermined function is supported. In other words, whether the predetermined function is supported is notified by whether information (parameters) for indicating whether the predetermined function is supported is transmitted. The information (parameters) for indicating whether the predetermined function is supported may be notified by using one bit of 1 or 0.

The higher layer processing unit 102 acquires the DL-SCH from the decoded uplink data (including the CRC) from the receiver 112. The higher layer processing unit 102 performs error detection on the uplink data transmitted by the terminal apparatus. For example, the error detection is performed in the MAC layer.

The controller 104 controls the transmitter 106 and the receiver 112 based on the various kinds of configuration information input from the higher layer processing unit 102/receiver 112. The controller 104 generates the downlink control information (DCI) based on the configuration information input from the higher layer processing unit 102/receiver 112, and outputs the generated downlink control information to the transmitter 106. For example, the controller 104 configures, based on the configuration information on the DMRS input from the higher layer processing unit 102/receiver 112 (whether the configuration is a DMRS configuration 1 or a DMRS configuration 2), the frequency allocation of the DMRS (an even subcarrier or an odd subcarrier in the case of DMRS configuration 1, and any of the zeroth to the second sets in the case of the DMRS configuration 2), and generates the DCI.

The controller 104 determines the MCS of the PUSCH in consideration of channel quality information (CSI Measurement result) measured by the channel estimation unit 1122. The controller 104 determines an MCS index corresponding to the MCS of the PUSCH. The controller 104 includes, in the uplink grant, the MCS index determined.

The transmitter 106 generates the PBCH, the PDCCH, the PDSCH, the downlink reference signal, and the like in accordance with the signal input from the higher layer processing unit 102/controller 104. The coding unit 1060 performs encoding (including repetition) using block code, convolutional code, turbo code, polar coding, LDPC code, or the like on the BCH, the DL-SCH, and the like input from the higher layer processing unit 102 by using a predetermined coding scheme/a coding scheme determined by the higher layer processing unit 102. The coding unit 1060 performs puncturing on the coded bits based on the coding rate input from the controller 104. The modulating unit 1062 performs data modulation on the coded bits input from the coding unit 1060 by using a predetermined modulation scheme (modulation order)/a modulation scheme (modulation order) input from the controller 104, such as the BPSK, QPSK, 16 QAM, 64 QAM, or 256 QAM. The modulation order is based on the MCS index selected by the controller 104.

The downlink control signal generation unit 1064 adds the CRC to the DCI input from the controller 104. The downlink control signal generation unit 1064 encrypts (scrambles) the CRC by using the RNTI. Furthermore, the downlink control signal generation unit 1064 performs QPSK modulation on the DCI to which the CRC is added, and generates the PDCCH. The downlink reference signal generation unit 1066 generates a sequence known to the terminal apparatus as a downlink reference signal. The known sequence is determined by a predetermined rule based on a physical cell identity for identifying the base station apparatus 10 and the like.

The multiplexing unit 1068 multiplexes the PDCCHs/downlink reference signals/modulation symbols of the respective channels input from the modulating unit 1062. In other words, the multiplexing unit 1068 maps the PDCCHs/ downlink reference signals/modulation symbols of the respective channels to the resource elements. The resource elements to which the mapping is performed are controlled by downlink scheduling input from the controller 104. The resource element is the minimum unit of a physical resource including one OFDM symbol and one subcarrier. Note that, in a case of performing MIMO transmission, the transmitter 106 includes the coding units 1060 and the modulating units 1062. Each of the number of the coding units 1060 and the number of the modulating units 1062 is equal to the number of layers. In this case, the higher layer processing unit 102 configures the MCS for each transport block in each layer.

The radio transmitting unit 1070 performs Inverse Fast Fourier Transform (IFFT) on the multiplexed modulation symbols and the like to generate OFDM symbols. The radio transmitting unit 1070 adds cyclic prefixes (CPs) to the OFDM symbols to generate a baseband digital signal. Furthermore, the radio transmitting unit 1070 converts the digital signal into an analog signal, removes unnecessary frequency components from the analog signal by filtering, performs up-conversion to a signal of a carrier frequency, performs power amplification, and outputs the resultant signal to the transmit antenna 108 for transmission.

In accordance with an indication from the controller 104, the receiver 112 detects (separates, demodulates, and decodes) the reception signal received from the terminal apparatus 20 through the receive antenna 110, and inputs the decoded data to the higher layer processing unit 102/controller 104. The radio receiving unit 1120 converts the uplink signal received through the receive antenna 110 into a baseband signal by down-conversion, removes unnecessary frequency components from the baseband signal, controls an amplification level such that a signal level is suitably maintained, performs orthogonal demodulation based on an in-phase component and an orthogonal component of the received signal, and converts the resulting orthogonally-demodulated analog signal into a digital signal. The radio receiving unit 1120 removes a part corresponding to the CP from the converted digital signal. The radio receiving unit 1120 performs Fast Fourier Transform (FFT) on the signal from which the CPs have been removed, and extracts a signal in the frequency domain. The signal in the frequency domain is output to the demultiplexing unit 1124.

The demultiplexing unit 1124 demultiplexes the signals input from the radio receiving unit 1120 into signals, such as the PUSCH, the PUCCH, and the uplink reference signal, based on uplink scheduling information (such as uplink data channel allocation information) input from the controller 104. The uplink reference signal resulting from the demultiplexing is input to the channel estimation unit 1122. The PUSCH and PUCCH resulting from the demultiplexing are output to the equalization unit 1126.

The channel estimation unit 1122 uses the uplink reference signal to estimate a frequency response (or a delay profile). The result of frequency response in the channel estimation for demodulation is input to the equalization unit 1126. The channel estimation unit 1122 measures the uplink channel condition (measures a Reference Signal Received Power (RSRP), a Reference Signal Received Quality (RSRQ), and a Received Signal Strength Indicator (RSSI)) by using the uplink reference signal. The measurement of the uplink channel state is used to determine the MCS for the PUSCH and the like.

The equalization unit 1126 performs processing to compensate for an influence in a channel based on the frequency response input from the channel estimation unit 1122. As a method for the compensation, any existing channel compensation, such as a method of multiplying an MMSE weight or an MRC weight and a method of applying an MLD, is also applicable. The demodulation unit 1128 performs demodulation processing based on the information on a predetermined modulation scheme/modulation scheme indicated by the controller 104.

The decoding unit 1130 performs decoding processing on the output signal from the demodulation unit based on the information on a predetermined coding rate/coding rate indicated by the controller 104. The decoding unit 1130 inputs the decoded data (such as the UL-SCH) to the higher layer processing unit 102.

Figure 3:
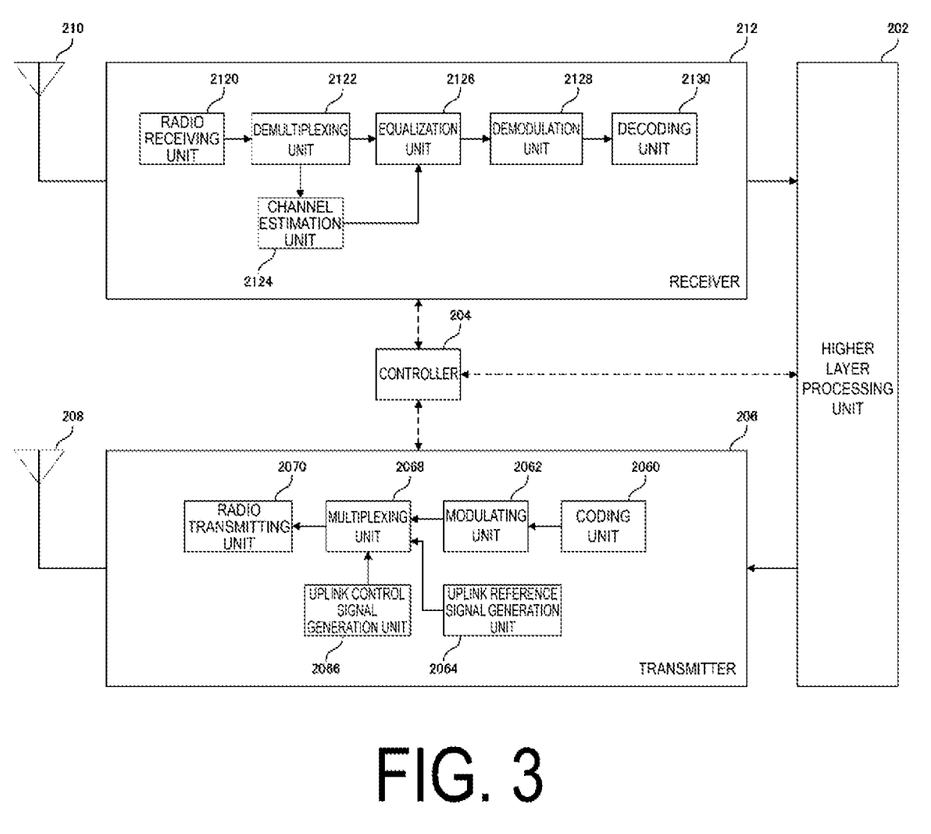
FIG. 3 is a diagram illustrating a configuration example of a terminal apparatus according to the first embodiment.

FIG. 3 is a schematic block diagram illustrating a configuration of the terminal apparatus 20 according to the present embodiment. The terminal apparatus 20 is configured to include a higher layer processing unit (higher layer processing step) 202, a controller (control step) 204, a transmitter (transmitting step) 206, a transmit antenna 208, a receive antenna 210, and a receiver (receiving step) 212.

The higher layer processing unit 202 performs processing of the medium access control (MAC) layer, the packet data convergence protocol (PDCP) layer, the radio link control (RLC) layer, and the radio resource control (RRC) layer. The higher layer processing unit 202 manages various kinds of configuration information of the terminal apparatus itself. The higher layer processing unit 202 notifies the base station apparatus 10 of information for indicating terminal apparatus functions supported by the terminal apparatus itself (UE Capability) via the transmitter 206. The higher layer processing unit 202 notifies the UE Capability by RRC signaling.

The higher layer processing unit 202 acquires the decoded data, such as the DL-SCH and the BCH, from the receiver 212. The higher layer processing unit 202 generates the HARQ-ACK from a result of the error detection of the DL-SCH. The higher layer processing unit 202 generates the SR. The higher layer processing unit 202 generates the UCI including the HARQ-ACK/SR/CSI (including the CQI report). In a case that the DMRS configuration information is notified by the higher layer, the higher layer processing unit 202 inputs the information on the DMRS configuration to the controller 204. The higher layer processing unit 202 inputs the UCI and the UL-SCH to the transmitter 206. Note that some functions of the higher layer processing unit 202 may be included in the controller 204.

The controller 204 interprets the downlink control information (DCI) received via the receiver 212. The controller 204 controls the transmitter 206 in accordance with PUSCH scheduling/MCS index/Transmission Power Control (TPC), and the like acquired from the DCI for uplink transmission. The controller 204 controls the receiver 212 in accordance with the PDSCH scheduling/the MCS index and the like acquired from the DCI for downlink transmission. Furthermore, the controller 204 identifies the frequency allocation of the DMRS according to the information on the frequency allocation of the DMRS included in the DCI for downlink transmission and the DMRS configuration information input from the higher layer processing unit 202.

The transmitter 206 is configured to include a coding unit (coding step) 2060, a modulating unit (modulating step) 2062, an uplink reference signal generation unit (uplink reference signal generating step) 2064, an uplink control signal generation unit (uplink control signal generating step) 2066, a multiplexing unit (multiplexing step) 2068, and a radio transmitting unit (radio transmitting step) 2070.

In accordance with the control by the controller 204 (in accordance with the coding rate calculated based on the MCS index), the coding unit 2060 codes the uplink data (UL-SCH) input from the higher layer processing unit 202 by convolutional coding, block coding, turbo coding, or the like.

The modulating unit 2062 modulates the coded bits input from the coding unit 2060 (generates modulation symbols for the PUSCH) by a modulation scheme indicated from the controller 204/modulation scheme predetermined for each channel, such as BPSK, QPSK, 16 QAM, 64 QAM, and 256 QAM.

The uplink reference signal generation unit 2064 generates a sequence determined from a predetermined rule (formula), based on a physical cell identity (PCI), which is also referred to as a cell ID, or the like, for identifying the base station apparatus 10, a bandwidth in which the uplink reference signals are mapped, a cyclic shift, parameter values to generate the DMRS sequence, further the frequency allocation, and the like, in accordance with an indication by the controller 204.

In accordance with the indication from the controller 204, the uplink control signal generation unit 2066 encodes the UCI, performs the BPSK/QPSK modulation, and generates modulation symbols for the PUCCH.

In accordance with the uplink scheduling information from the controller 204 (transmission interval in the Configured Scheduling (CS) for the uplink included in the RRC message, frequency domain and time domain resource allocation included in the DCI, and the like), the multiplexing unit 2068 multiplexes the modulation symbols for the PUSCH, the modulation symbols for the PUCCH, and the uplink reference signals for each transmit antenna port (DMRS port) (in other words, the respective signals are mapped to the resource elements).

Here, configured scheduling (CS, configured grant scheduling) will be described. There are two types of transmission without dynamic grant. One is a configured grant type 1 given by the RRC and stored as the configured grant, and the other is a configured grant type 2 given by the PDCCH and stored and cleared as a configured grant based on L1 signaling indicating configured grant activation or deactivation. The type 1 and type 2 are configured in the RRC for each serving cell and for each BWP. Multiple configurations may be active simultaneously only in different serving cells. For the type 2, activation and deactivation are independent between serving cells. For the same serving cell, a MAC entity is configured in either the type 1 or type 2. In a case that the type 1 is configured, the RRC configures the following parameters.

cs-RNTI: the CS-RNTI for retransmission
    periodicity: a period of the configured grant type 1
    timeDomainOffset: an offset of a resource related to SFN=0 in the time domain
    timeDomainAllocation: allocation of the configured grant in the time domain including a parameter startSymbolAndLength
    nrofHARQ-Processes: the number of HARQ processes Furthermore, in a case that the type 2 is configured, the RRC configures the following parameters.

cs-RNTI: the CS-RNTI for activation, deactivation, and retransmission
    periodicity: a period of the configured grant type 2
    nrofHARQ-Processes: the number of HARQ processes That is, ConfiguredGrantConfig is used to configure uplink transmission without dynamic grant in accordance with the two schemes. The actual uplink grant is configured via RRC in the Configured Grant type 1, and is given via the PDCCH processed by the CS-RNTI in the Configured Grant Type 2.

A parameter repK configured in the higher layer defines the number of repetitions K applied to a transmitted transport block. A parameter repK-RV configured in the higher layer indicates a redundancy version pattern applied to the repetition. For the n-th transmission opportunity during K repetitions, transmission associated with the (mod(n−1, 4)+1)-th value in an RV sequence (redundancy version pattern) to be configured is performed. Additionally, the initial transmission of one transport block is started at the first transmission opportunity of K repetitions in a case that the RV sequence to be configured is {0, 2, 3, 1}. In a case that the RV sequence to be configured is {0, 3, 0, 3}, the transmission is started at any transmission opportunity of K repetitions associated with RV=0. In a case that the RV sequence to be configured is {0, 0, 0, 0}, the transmission is started at any transmission opportunity of K repetitions excluding the last transmission opportunity in a case of K=8. Even for any RV sequence, the repetition is terminated in a case of reaching, for the first time, any of a time after K retransmissions, the last transmission opportunity during K repetitions within a period P, or a time that the uplink grant for scheduling the same transport block in the period P is received. The terminal apparatus does not expect that a time period related to K retransmissions longer than a time period calculated by the period P is configured. For both the type 1 and type 2 PUSCH transmissions by the configured grant, in a case that repK>1 is configured in the terminal apparatus, the terminal apparatus iterates the transport block across the continuous slot of the repK. At this time, the terminal apparatus applies the same symbol allocation to each slot. In a case that a procedure of the terminal apparatus related to decision of the slot configuration determines (decides) the symbol of the slot to which allocation is applied as a downlink symbol, transmission in the slot is omitted in terms of PUSCH transmission of multiple slots. In a case that repK is configured, any of once, twice, four times, or eight times can be configured as the value. Note that, in a case that the RRC parameter itself is not present, the transmission is performed assuming that the number of repetitions is 1. Furthermore, repK-RV may be configured to any of {0, 2, 3, 1}, {0, 3, 0, 3}, and {0, 0, 0, 0}. Note that signals with different redundancy versions generated from the same transport block are signals formed from the same transport block (information bit sequence), but at least some of coded bits included therein are different.

Figure 4:
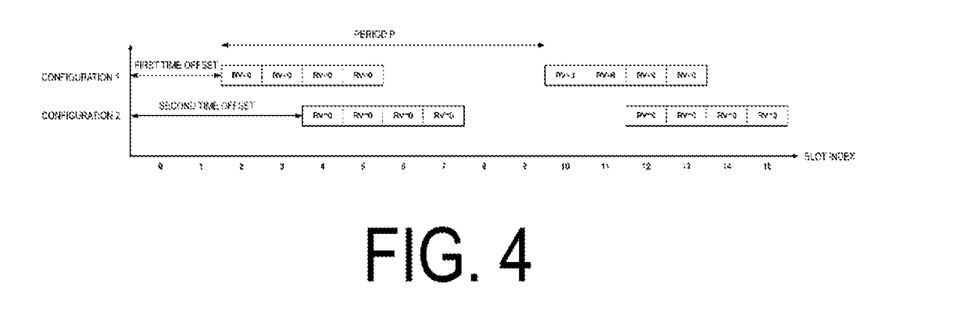
FIG. 4 is a diagram illustrating transmission opportunities in a case that multiple time offsets are configured according to the first embodiment.

Here, in a case that the RV sequence to be configured is {0, 0, 0, 0}, the transmission is started at any transmission opportunity of K repetitions excluding the last transmission opportunity in a case of K=8. In this case, the eight repetitions are not satisfied except for a case that the transmission is started from other than the initial transmission opportunity. Accordingly, in 3GPP, configuring multiple time offsets has been proposed. FIG. 4 illustrates a slot configuration in a case that multiple time offsets are configured. A case that a configuration 1 and a configuration 2 are configured is illustrated, but the present invention is not limited thereto, and three or more configurations may be configured. The horizontal axis indicates a slot index. Although a case that the slot is used as a reference is described in FIG. 4, any one as long as a section including multiple OFDM symbols, such as a mini-slot, may be used. FIG. 4 illustrates a case that the period is eight slots and the number of repetitions is four. In a case that only the configuration 1 is present, in a case that transmission is started from the slot index 2 or 10, four repetitions can be performed, but in a case that the transmission is started from the slot index 4 or 12, only two repetitions can be performed. However, in a case that the configuration 2 is provided, in a case that the transmission is started from the slot index 4 or 12, by performing transmission by the configuration 2, it is possible to achieve four repetitions.

Figure 5:
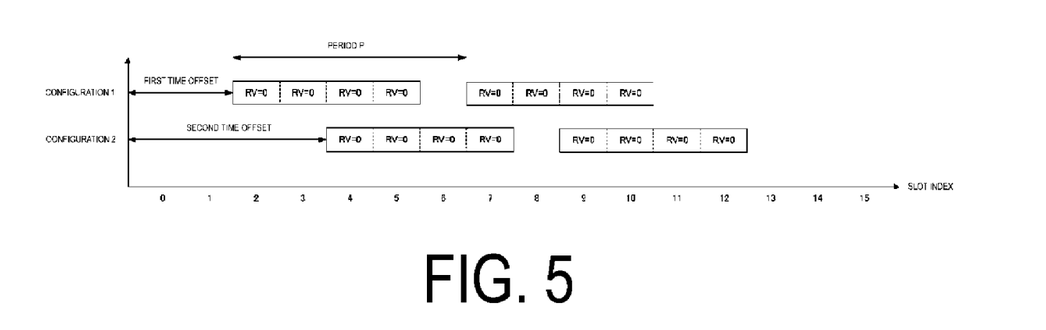
FIG. 5 is a diagram illustrating transmission opportunities in a case that multiple time offsets are configured according to the first embodiment, and is a diagram illustrating a case that the transmission opportunities by a second time offset partially overlap with multiple transmission opportunities by a first time offset.

As described above, by configuring the multiple time offsets, even in a case that transmission is not performed at the first transmission opportunity of the configuration 1, transmission in which prescribed repetitions are performed can be performed. However, as illustrated in FIG. 4, in prescribed slots (for example, slot indexes 4, 5, 12, and 13), transmission opportunities are configured in both the configuration 1 and the configuration 2. Here, a case that the terminal apparatus can select the configuration 1 and the configuration 2 is considered. For example, in a case that transmission is started from the slot index 4, in a case of transmitting by the configuration 1, two repetitions are performed, and transmission is not performed from the slot index 6 to at least the slot index 9. On the other hand, in a case of transmitting by the configuration 2, four repetitions are performed. As described above, since two patterns are present, the base station cannot grasp whether transmission is performed at the slot indexes 6 and 7. Accordingly, the base station apparatus needs to perform signal detection (user detection) at the slot indexes 6 and 7. In accordance with the result, a DCI transmission timing, allocation, and the like to the terminal apparatus need to be changed. Furthermore, in a case that transmission is started as the configuration 1 at the slot index 4, the number of repetitions four cannot be ensured. Accordingly, in a case that multiple transmission patterns are present by multiple time offsets being configured, the terminal apparatus starts transmission by a configuration (time offset) that causes the number of retransmissions to increase. In other words, transmission is started by a configuration becoming large in the remaining number of repetitions, that is, a configuration becoming long in a repetition period (section). Note that, in a case that the same time offset is configured, it may be regarded that transmission is performed by either configuration, but the terminal apparatus does not expect the same time offset being configured and notified from the base station apparatus. Furthermore, as illustrated in FIG. 5, in a case that the period P includes five slots (5×14 OFDM symbols) and the number of repetitions repK is four, the configuration is as illustrated in FIG. 5. In this case, in a case that transmission is started from the slot index 5, transmission is started by the configuration 2 that causes the number of retransmissions to increase. After transmitting at the slot indexes 5, 6, and 7, in a case of transmitting at the slot index 8, four repetitions can be achieved, but retransmission is not performed using multiple configurations. As a result, in a case that transmission is performed at the slot index 8, the base station can perform processing assuming that a transport block different from the transmissions at the slot indexes 5, 6, and 7 has been transmitted. That is, in a case that transmission is started by each configuration, a new transport block cannot be transmitted until the end of ensured transmission opportunity. Alternatively, the base station apparatus may not perform the configuration in which the transmission opportunities in the first configuration overlap with the multiple consecutive transmission opportunities of the second configuration as illustrated in FIG. 5, and the terminal apparatus may not expect it as well.

Here, in the case of TDD instead of FDD, in a case that the slot (or symbol) for transmission is a downlink slot, the number of retransmissions may be defined in consideration of a slot in which retransmissions are not possible. Furthermore, communication retransmission by the configured grant is retransmission based on a grant by the DCI. The HARQ process of the DCI may be based on the value indicated by each time offset, or may be determined based on the value indicated by a first time offset.

Next, a method for configuring multiple time offsets will be described. In the method for configuring multiple time offsets in the configured grant type 1, a second time offset value may be configured by configuring a parameter of timeDomainOffset2, for example, in addition to timeDomainOffset, which is an RRC parameter of the NR release 15. The number of additional parameters may be greater than one. Alternatively, a difference in time offset may be taken as a parameter. For example, in FIG. 4, since the difference between the first time offset and the second time offset is two slots, the higher layer processing unit of the base station apparatus configures the difference as the RRC parameter. The terminal apparatus calculates the second time offset from the first time offset and the difference between the time offsets. Note that in order to configure three or more time offsets, the number of additional time offsets may be configured separately.

The time offset of the configured grant type 2 in the NR release 15 is determined based on a time resource where the DCI (PDCCH) to (re)activate the configured grant is received. Here, in a case that the field related to the HARQ process number and the field related to the redundancy version in the DCI are all configured to 0, the configured grant is activated. In order to configure multiple time offsets, instead of activating in a case that all the field related to the HARQ process number is made to 0, different time offsets can be configured based on fields related to the HARQ process number. For example, in a case that activation by 0001 is performed as the field related to the HARQ process number, in a case that the DCI being 0001 is received as the field related to the HARQ process number, the configuration of the configured grant that was valid before the reception is discarded, and reactivation is performed as the configured grant in which the field related to the HARQ process number is 0001. On the other hand, in a case that activation by 0001 is performed as the field related to the HARQ process number, in a case that the DCI being 0010 is received as the field related to the HARQ process number, while maintaining the configuration of the configured grant that was valid before the reception, activation is performed as the configured grant in which the field related to the HARQ process number is 0010. As a result, multiple configurations can be activated. Note that the PDCCH may be effective only in the case that some bits of the field related to the HARQ process number are 0. The some bits may be predetermined, such as the most significant two bits, or may be determined in accordance with the RRC parameter related to the number of processes of the HARQ. For example, in a case that the RRC parameter related to the number of processes of the HARQ is 16 and the field related to the HARQ process number includes four bits, the field related to the HARQ process number is not related to the validity of the PDCCH. On the other hand, in a case that the RRC parameter related to the number of processes of the HARQ is 8 and the field related to the HARQ process number includes four bits, only in a case that the upper two bits are zero in the field related to the HARQ process number, the PDCCH is made valid, activation is performed, for example. By limiting the field of the DCI for validating the PDCCH in accordance with the configuration of the RRC parameter as described above, erroneous detection of the PDCCH can be suppressed. Note that for the deactivation, all the field related to the HARQ process number may be set to 0. In the HARQ of the PDCCH to be activated, 0 may be excluded from all the field related to the HARQ process number. Furthermore, in the deactivation, all configurations of the configured grant type 2 may be deactivated in one PDCCH.

The MCS and the like may be indicated at the time of the (re)activation by the PDCCH. The operation at this time will be described below. In a case that the HARQ process number is configured as 0001, in a case that the PDCCH which takes the HARQ process number as 0001 is received, the configuration is changed to a parameter specified by the PDCCH and reactivated. On the other hand, in a case that the HARQ process number is configured as 0001, in a case that the PDCCH which takes the HARQ process number as 0010 is received, a time offset is added based on a PUSCH transmission timing specified by the PDCCH. At this time, the configuration such as the MCS and the like is changed to a parameter specified by the newly received PDCCH. Note that it can be thought that multiple configurations is made possible only in the configured grant type 1 and only one configuration can be configured in the configured grant type 2. As a result, instead of specifying the two pieces of control information of the RRC and the DCI, multiple configurations can be configured by specifying only the RRC.

Another example of a (re)activation method by the PDCCH is described below. In a case that the number of time offsets and a difference with a reference time offset (first time offset) is configured by the RRC parameter and the PDCCH for activating the configured grant type 2 is received, the configured grant type 2 including the multiple time offsets is enabled.

In a case that a higher layer parameter (frequencyHopping) related to frequency hopping is configured, as the value thereof, a mode 1 or mode 2 can be configured. The mode 2 indicates inter-slot hopping, and is a mode for transmitting by changing the frequency for each slot in a case of transmission using multiple slots. On the other hand, the mode 1 indicates in-slot hopping, and is a mode for transmitting by dividing the slot into the first half and the second half and changing the frequency between the first half and the second half in a case of transmission using one or multiple slots. As frequency allocation in frequency hopping, the radio resource allocation in the frequency domain notified by the DCI or RRC is applied to the first hop, and for the frequency allocation of the second hop, with respect to the radio resource used in the first hop a radio resource that is shifted by a value configured by a higher layer parameter (frequencyHoppingOffset) related to a frequency hopping amount is allocated.

The radio transmitting unit 2070 performs Inverse Fast Fourier Transform (IFFT) on the multiplexed signals to generate OFDM symbols. The radio transmitting unit 2070 adds CPs to the OFDM symbols to generate a baseband digital signal. Furthermore, the radio transmitting unit 2070 converts the baseband digital signal into an analog signal, removes unnecessary frequency components from the analog signal, converts the signal into a signal of a carrier frequency by up-conversion, performs power amplification, and transmits the resultant signal to the base station apparatus 10 via the transmit antenna 208.

The receiver 212 is configured to includes a radio receiving unit (radio receiving step) 2120, a demultiplexing unit (demultiplexing step) 2122, a channel estimation unit (channel estimating step) 2144, an equalization unit (equalizing step) 2126, a demodulation unit (demodulating step) 2128, and a decoding unit (decoding step) 2130.

The radio receiving unit 2120 converts the downlink signal received through the receive antenna 210 into a baseband signal by down-conversion, removes unnecessary frequency components from the baseband signal, controls an amplification level such that a signal level is suitably maintained, performs orthogonal demodulation based on an in-phase component and an orthogonal component of the received signal, and converts the resulting orthogonally-demodulated analog signal into a digital signal. The radio receiving unit 2120 removes a part corresponding to the CP from the digital signal resulting from the conversion, performs the FFT on the signal from which the CP has been removed, and extracts a signal in the frequency domain.

The demultiplexing unit 2122 separates the extracted signal in the frequency domain into the downlink reference signal, the PDCCH, the PDSCH, and the PBCH. A channel estimation unit 2124 uses the downlink reference signal (such as the DM-RS) to estimate a frequency response (or delay profile). The result of frequency response in the channel estimation for demodulation is input to the equalization unit 1126. The channel estimation unit 2124 measures the uplink channel state (measures a Reference Signal Received Power (RSRP), a Reference Signal Received Quality (RSRQ), a Received Signal Strength Indicator (RSSI), and a Signal to Interference plus Noise power Ratio (SINR)) by using the downlink reference signal (such as the CSI-RS). The measurement of the downlink channel state is used to determine the MCS for the PUSCH and the like. The measurement result of the downlink channel state is used to determine the CQI index and the like.

The equalization unit 2126 generates an equalization weight based on an MMSE criterion, from the frequency response input from the channel estimation unit 2124. The equalization unit 2126 multiplies the input signal (the PUCCH, the PDSCH, the PBCH, and the like) from the demultiplexing unit 2122 by the equalization weight. The demodulation unit 2128 performs demodulation processing based on information of the predetermined modulation order/the modulation order indicated by the controller 204.

The decoding unit 2130 performs decoding processing on the output signal from the demodulation unit 2128 based on information of the predetermined coding rate/the coding rate indicated by the controller 204. The decoding unit 2130 inputs the decoded data (such as the DL-SCH) to the higher layer processing unit 202.

A program running on an apparatus according to the present invention may serve as a program that controls a Central Processing Unit (CPU) and the like to cause a computer to operate in such a manner as to realize the functions of the above-described embodiment according to the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Note that the apparatuses in the above-described embodiment may be partially enabled by a computer. In that case, a program for realizing the functions of the embodiment may be recorded on a computer readable recording medium. This configuration may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium"

may be any of a semiconductor recording medium, an optical recording medium, a magnetic recording medium, and the like.

Moreover, the "computer-readable recording medium" may include a medium that dynamically retains a program for a short period of time, such as a communication line that is used for transmission of the program over a network such as the Internet or over a communication line such as a telephone line, and may also include a medium that retains a program for a fixed period of time, such as a volatile memory within the computer system for functioning as a server or a client in such a case. Furthermore, the above-described program may be one for realizing some of the above-described functions, and also may be one capable of realizing the above-described functions in combination with a program already recorded in a computer system.

Furthermore, each functional block or various characteristics of the apparatuses used in the above-described embodiment may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuit may include a digital circuit, or may include an analog circuit. Furthermore, in a case that with advances in semiconductor technology, a circuit integration technology appears that replaces the present integrated circuits, it is also possible to use an integrated circuit based on the technology.

Note that the invention of the present patent application is not limited to the above-described embodiment. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiment of the present invention have been described in detail above referring to the drawings, but the specific configuration is not limited to the embodiment and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

The present invention can be preferably used in a base station apparatus, a terminal apparatus, and a communication method.

The invention claimed is:

1. A terminal apparatus for communicating with a base station apparatus via configured grant scheduling, the terminal apparatus comprising:
  a receiver configured to receive a Radio Resource Control (RRC) message including a plurality of configurations of the configured grant scheduling for transmission of a Physical Uplink Shared Channel (PUSCH), each configuration associated with a time offset and a number of repetitions of the transmission of the PUSCH; and
  a controller configured to:
    activate the plurality of configurations based on the RRC message,
    select a configuration, among the plurality of configurations, that causes the transmission of the PUSCH to be repeated a highest number of times indicated by the number of repetitions associated with the selected configuration, and
    determine a start of the transmission of the PUSCH based on an offset that is associated with the selected configuration.

2. The terminal apparatus according to claim 1, wherein:
  the receiver is further configured to receive a first plurality of physical downlink control channels (PDCCHs), each indicating one of the time offsets, and a second PDCCH indicating a release of the plurality of configurations of the configured grant scheduling; and
  the controller is configured to activate the plurality of configurations of the configured grant scheduling further based on the first plurality of PDCCHs, and to release the plurality of configurations of the configured grant scheduling based on the second PDCCH.

3. The terminal apparatus according to claim 1, wherein each of the plurality of configurations of the configured grant scheduling is activated using a value of a field related to a hybrid automatic repeat request (HARQ) process number of a physical downlink control channel (PDCCH).

4. The terminal apparatus according to claim 1, wherein the selected configuration causes the transmission of the PUSCH to be repeated the highest number of times regardless of when the transmission of the PUSCH is started.

5. A base station apparatus for communicating with a terminal apparatus via configured grant scheduling, the base station apparatus comprising:
  a transmitter configured to transmit a Radio Resource Control (RRC) message including a plurality of configurations of the configured grant scheduling for reception of a Physical Uplink Shared Channel (PUSCH), each configuration associated with a time offset and a number of repetitions of the transmission of the PUSCH; and
  a controller configured to:
    activate the plurality of configurations based on the RRC message,
    select a configuration, among the plurality of configurations, that causes the transmission of the PUSCH to be repeated a highest number of times indicated by the number of repetitions associated with the selected configuration, and
    determine a start of the reception of the PUSCH based on an offset that is associated with the selected configuration.

6. The base station apparatus according to claim 5, wherein:
  the transmitter is further configured to transmit a first plurality of physical downlink control channels (PDCCHs), each indicating one of the time offsets, and a second PDCCH indicating a release of the plurality of configurations of the configured grant scheduling; and the controller is configured to activate the plurality of configurations of the configured grant scheduling further based on the first plurality of PDCCHs, and to release the plurality of configurations of the configured grant scheduling based on the second PDCCH.

7. The base station apparatus according to claim 5, wherein each of the plurality of configurations of the configured grant scheduling is activated using a value of a field related to a hybrid automatic repeat request (HARQ) process number of a physical downlink control channel (PDCCH).

8. The base station apparatus according to claim 5, wherein the selected configuration causes the reception of the PUSCH to be repeated the highest number of times regardless of when the reception of the PUSCH is started.

* * * * *